US010315107B2

(12) United States Patent
Schmitz et al.

(10) Patent No.: US 10,315,107 B2
(45) Date of Patent: Jun. 11, 2019

(54) CONTROLLER BUTTON HAVING A SIMULATED AXIS OF ROTATION

(71) Applicant: Microsoft Technology Licensing, LLC, Redmond, WA (US)

(72) Inventors: Aaron Schmitz, Redmond, WA (US); Gabriel M. R. Gassoway, Issaquah, WA (US); Andrew McKinley Schroeder, Redmond, WA (US); Jonathan Shea Robinson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/667,340

(22) Filed: Aug. 2, 2017

(65) Prior Publication Data

US 2019/0038969 A1 Feb. 7, 2019

(51) Int. Cl.
*A63F 13/21* (2014.01)
*A63F 13/24* (2014.01)

(52) U.S. Cl.
CPC .............. *A63F 13/24* (2014.09); *A63F 13/21* (2014.09); *A63F 2300/8082* (2013.01)

(58) Field of Classification Search
CPC ................. A63F 13/24; A63F 13/21
See application file for complete search history.

(56) References Cited

U.S. PATENT DOCUMENTS 3,467,311 A 9/1969 Ernst
5,667,220 A * 9/1997 Cheng ................ A63F 13/06
273/148 B
2002/0103025 A1 8/2002 Murzanski et al.
2005/0099389 A1 5/2005 Ma et al.
2007/0227256 A1 * 10/2007 Wright .................. A63F 13/06
73/780

(Continued)

FOREIGN PATENT DOCUMENTS

DE 1603531 A1 7/1971

OTHER PUBLICATIONS

"International Search Report and Written Opinion Issued in PCT Application No. PCT/US2018/035253", dated Aug. 30, 2018, 10 Pages.

*Primary Examiner* — William H McCulloch, Jr.
*Assistant Examiner* — Yingchuan Zhang
(74) *Attorney, Agent, or Firm* — Fiala & Weaver P.L.L.C.

(57) ABSTRACT

A user input device is provided that includes a button-based control mechanism. The button-based control mechanism includes a button, the button including a user-depressible button top and a button stem, and a button depression guide disposed within an internal cavity of the user input device that engages with the button stem to cause the button to move from a default position and along a substantially arc-shaped path when pressure is applied to the button top. The substantially arc-shaped path may be around an axis of rotation that is external to the user input device. The button-based control mechanism further includes a button biasing mechanism disposed within the internal cavity that returns the button to the default position when the pressure is removed from the button top and at least one sensor that detects actuation of the button responsive to the movement of the button away from the default position.

20 Claims, 10 Drawing Sheets

(56) References Cited

U.S. PATENT DOCUMENTS

| | | |
|---|---|---|
| 2011/0300994 A1* | 12/2011 | Verkaaik .............. A61H 1/0274 |
| | | 482/51 |
| 2012/0050232 A1 | 3/2012 | Ikeda et al. |
| 2014/0378227 A1* | 12/2014 | Lee ......................... A63F 13/24 |
| | | 463/37 |
| 2015/0119145 A1 | 4/2015 | Jaouen |
| 2016/0317919 A1 | 11/2016 | Gassoway et al. |
| 2016/0361634 A1 | 12/2016 | Gassoway et al. |
| 2016/0361639 A1 | 12/2016 | Schmitz et al. |
| 2017/0001106 A1 | 1/2017 | Gassoway et al. |
| 2017/0092446 A1 | 3/2017 | Schmitz |
| 2017/0189799 A1 | 7/2017 | Anderson et al. |
| 2018/0099225 A1* | 4/2018 | Furuike ................. A63F 13/235 |

* cited by examiner

CONTROLLER BUTTON HAVING A SIMULATED AXIS OF ROTATION

BACKGROUND

Various types of handheld controllers exist, including handheld game controllers. A game controller is a type of user input device that is designed to facilitate user interaction with a video game, virtual reality simulation, or other application executing on a computer, video game console, or other platform. For example, a game controller may provide a means by which a user can control a character or object within a video game, interact with a virtual reality simulation, navigate a graphical user interface, or the like. A variety of different types of game controllers exist and each game controller type may include one or more user-actuatable control elements via which a user can provide input. For example, a game controller may include one or more buttons that a user can actuate manually, such as by pressing on or squeezing the button(s) with one or more fingers, to provide input.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user input device, such as a game controller, that includes a button-based control mechanism is described herein. The user input device includes a housing that defines an internal cavity of the user input device and includes an aperture. The button-based control mechanism includes a button comprising a button top and a button stem, where the button top extends into or through the aperture in the housing such that the button top is externally accessible with respect to the housing and the button stem is disposed within the internal cavity of the user input device. The button-based control mechanism further includes a button depression guide disposed within the internal cavity of the user input device that engages with the button stem to cause the button to move from a default position and along a substantially arc-shaped path when pressure is applied to the button top. In an embodiment, the substantially arc-shaped path is around an axis of rotation that is external to the user input device. The button-based control mechanism further includes a button biasing mechanism disposed within the internal cavity that returns the button to the default position when the pressure is removed from the button top and at least one sensor that detects actuation of the button responsive to movement of the button away from the default position.

Further features and advantages of various embodiments of the disclosure, as well as the structure and operation of various embodiments of the disclosure, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1A:
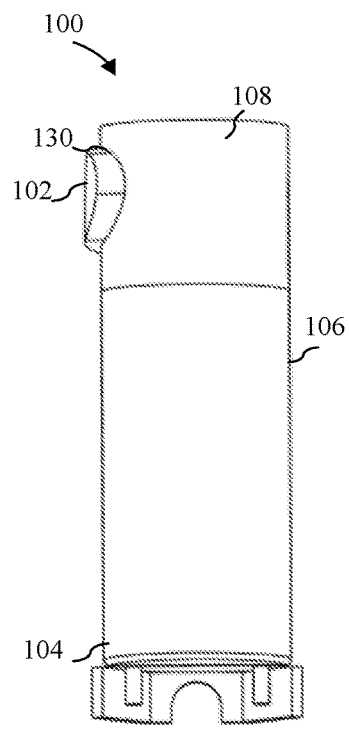
FIGS. 1A and 1B show top and side perspective views, respectively, of a user input device, according to an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example User Input Device Embodiments

User input devices exist that include various user-actuatable control elements, such as buttons, triggers, thumbsticks, and the like. Such user input devices may enable users to interact with various applications or with other devices. For instance, a television remote control is a user input device that enables a user to interact with a television. Another form of user input device may be used to control an unmanned aircraft (e.g., a drone) or land-based vehicle. A game controller is a type of user input device that is designed to facilitate user interaction with a video game, virtual reality simulation, or other application executing on a computer, video game console, or other platform. For example, a game controller may provide a means by which a user can control a character or object within a video game, interact with a virtual reality simulation, navigate a graphical user interface, or the like. A variety of different types of game controllers exist and each game controller type may include one or more user-actuatable control elements via which a user can provide input. For example, a conventional handheld game controller may include one or more user-actuatable buttons, triggers, thumbsticks, directional pads, touch pads, and the like. Each of these control elements may be manipulated by a user to generate various control signals for interacting with a video game.

As noted above, a handheld game controller may include one or more buttons. A user may actuate a game controller button by depressing or squeezing the button with one or more fingers. If a button of a handheld game controller is not designed so that it can be manipulated by a user in a manner that feels natural and that accords with the biomechanics of the user's hand, then interaction with that button may cause discomfort or strain for the user. Furthermore, user interaction with the button may be limited or impeded due to such a design, which may cause the user to have a degraded or sub-optimal experience with the application (e.g., video game or virtual reality simulation) for which the game controller is being used.

In an embodiment described herein, a user input device comprises a game controller that includes a cylindrical portion and a button that a user interacts with by curling one or more fingers around the cylindrical portion of the game controller. To improve the user experience, the game controller includes features that cause the button, when depressed by the user's finger, to move along an arc-shaped path that is similar to the path that the user's finger would normally travel when the user flexes her finger in the direction of her palm. The movement of the button along the arc-shaped path may simulate rotation around an axis that is external to the game controller. By simulating such an axis of rotation, the button-based control mechanism described herein enables a user to actuate the button in a manner that feels natural and that accords with the biomechanics of the user's hand. Consequently, embodiments described herein enable a user to interact with a game controller button in a manner that feels natural, comfortable, and is unlikely to cause any strain. Furthermore, because such embodiments avoid limiting or impeding the user's interaction with the button, such embodiments will not degrade the user's experience with the application (e.g., video game or virtual reality simulation) for which the game controller is being used.

The embodiments described herein are not limited to game controllers, but are applicable to all types of user input devices that include one or more user-actuatable buttons. Furthermore, the embodiments described herein are not limited to user input devices having a substantially cylindrical shape, but may be implemented in any user input device in which a button may be actuated using a curving motion of a finger, palm or other body part.

Figure 1B:
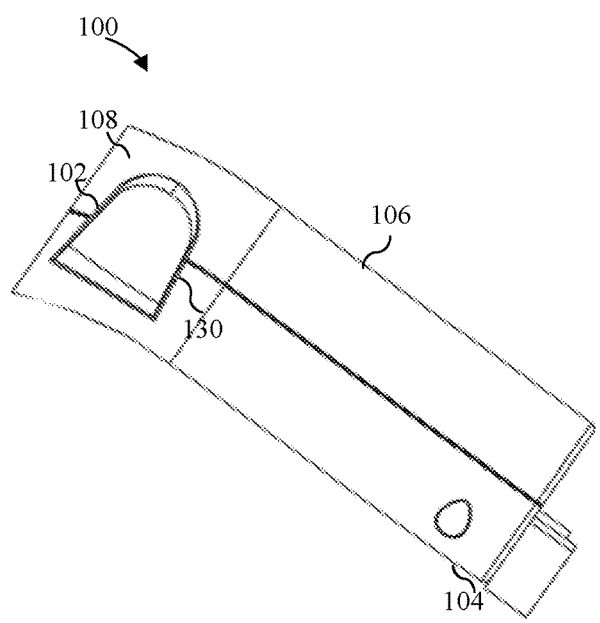

To help illustrate the foregoing, FIGS. 1A and 1B will now be described. In particular, FIGS. 1A and 1B show top and side perspective views, respectively, of an example user input device 100 in accordance with an embodiment. User input device 100 may be a game controller, although this is not intended to be limiting. User input devices to which embodiments apply may have different shapes, different sizes, different numbers and/or placements of user interface features (e.g., buttons, knobs, switches, triggers, pads, sticks), and/or other differences from user input device 100 shown in FIGS. 1A and 1B. For instance, user input devices may include hand-operated controls or joystick-type devices such as flight controls for aircrafts, flight simulators, boosted boards, or steering wheels. In embodiments, complicated track profiles may allow for button actuation beyond simple button rotation. Furthermore, user input device 100 may comprise only a portion of a user input device, in which case FIGS. 1A and 1B may be considered a partial view of user input device 100.

As shown in FIGS. 1A and 1B, user input device 100 includes a housing 106 having a top portion 108 and a bottom portion 104, and a button 102 that emerges from an aperture 130 in housing 106. Housing 106 may have a substantially cylindrical shape as shown. In this example, button 102 represents a trigger-like button that can be depressed by a finger of a user. For example, a user may hold user input device 100 by curling the fingers of her right hand around the cylindrically-shaped body thereof, such that the user's right pointer or middle finger are aligned with button 102. In this way, by curling the pointer or middle finger toward her palm, the user can depress button 102 by generating pressure in a direction that is substantially in the same direction as the natural motion of the tip of her finger. In the current example, button 102 is configured to pivot toward the inside of housing 106 when depressed. As will be described in further detail herein, this is accomplished by certain mechanisms internal to user input device 100 (not shown in FIG. 1A or 1B) that guide a portion of button 102 along a substantially arc-shaped path when button 102 is depressed. This substantially arc-shaped path is similar to the path that the user's finger would normally travel when the user flexes her finger in the direction of her palm. The movement of the button along the arc-shaped path may simulate rotation around an axis that is external to the game controller. In FIGS. 1A and 1B, button 102 is shown in a default, or non-depressed position. When depressed (e.g., pushed or squeezed) by a finger of a user, button 102 is pivoted towards the inside of housing 106 in a substantially arc-shaped path as noted above. The depression of button 102 may be detected, sensed, or measured by one or more sensors within user input device 100. The output of such sensor(s) may be used as input to an application or other device that is being controlled by user input device 100, and such input may be used to control such application or other device. For example, the sensed actuation of button 102 may cause an object to be picked up and/or carried in a virtual reality simulation, although this is only one of a vast multitude of potential control outcomes.

Button 102 of user input device 100 may be placed in a variety of positions responsive to user interaction therewith. For example, button 102 can be non-depressed (as shown in FIGS. 1A and 1B), fully depressed or placed in one or more additional positions when depressed by a user, such as being 50% depressed or some other non-fully depressed position. In embodiments that will be described in more detail herein, user input device 100 determines a degree of depression of button 102 and/or a force applied via button 102 when button 102 is fully depressed, and communicates this information to an application or other device being controlled by user input device 100. In a further embodiment that will also be discussed herein, user input device 100 includes an internal button biasing mechanism (not shown in FIGS. 1A and 1B), that causes button 102 to return to a default, non-depressed position when a user is not applying pressure to button 102.

Button 102 may be manufactured as a single component or can be assembled from multiple interconnecting parts. Button 102 may be manufactured from any suitable material(s), including plastic (e.g., through injection molding), rubber, metal, composites, or a combination of metals/alloys, etc. Housing 106 may be formed as a single component or by two or more connected or interlocking parts (e.g., top portion 108 and bottom portion 104). Housing 106 may be made from any suitable material(s), including plastic (e.g., through injection molding), rubber, metal, composites, or a combination of metals/alloys, etc.

User input device 100 may be designed in various ways to enable button 102 to be depressed along a substantially arc-shaped path. Subsections A-F, below, describes different button-based control mechanisms in accordance with various embodiments, as well as other potential embodiments.

A. Example Button-Based Control Mechanism with Guided Pins and Spring

Figure 2A:
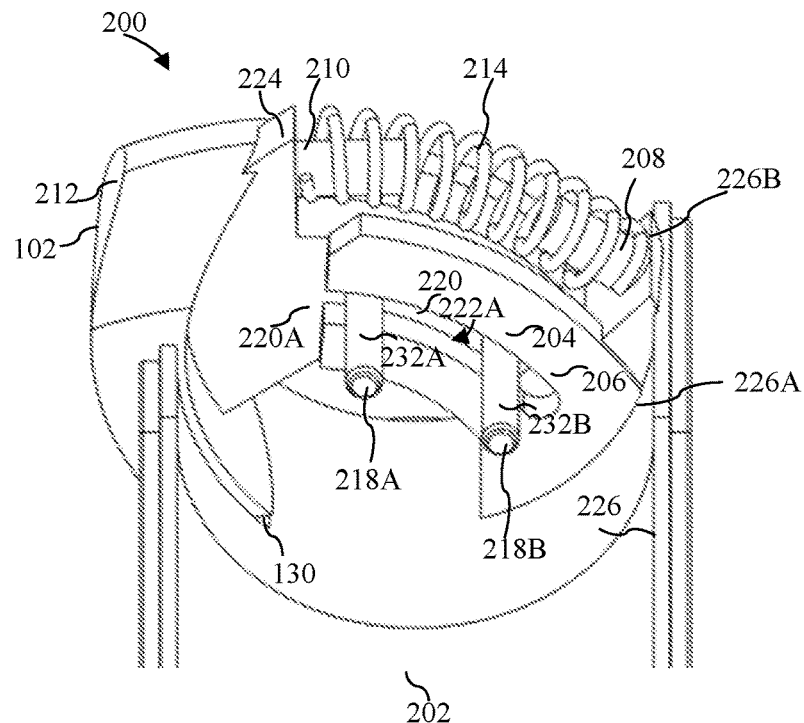
FIGS. 2A and 2B show perspective views of a portion of the user input device of FIGS. 1A and 1B that includes a button-based control mechanism.
Figure 2B:
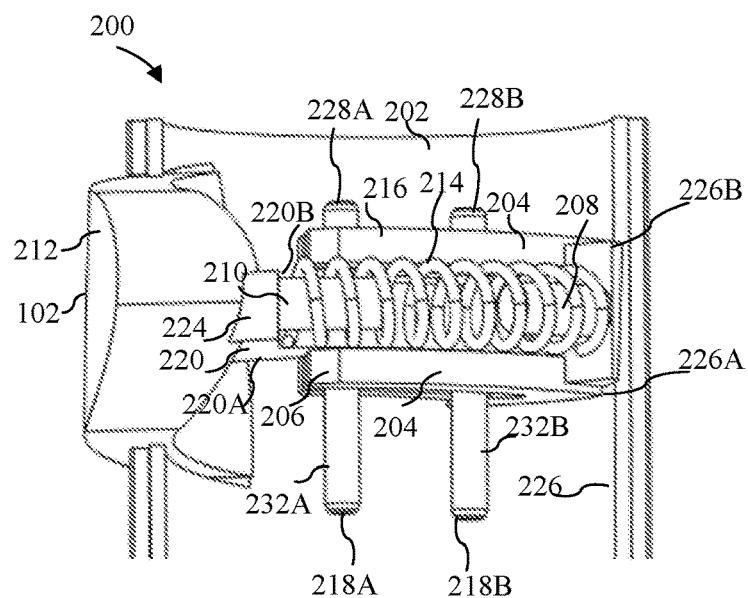

As described above, user input devices can be configured in various ways to enable depression of a button around a simulated axis of rotation. For example, FIGS. 2A and 2B show perspective views, respectively, of a portion of user input device 100 of FIGS. 1A and 1B that includes a button-based control mechanism 200 that enables depression of a button around a simulated axis of rotation. As shown in FIGS. 2A and 2B, and with continued reference to FIGS. 1A and 1B, housing 106 of user input device 100 defines an internal cavity 202 within which are disposed various components of button-based control mechanism 200 of user input device 100. Button-based control mechanism 200 includes button 102, a button depression guide 204, a button biasing mechanism 214, and one or more sensors (not shown in FIGS. 2A and 2B).

As shown in FIGS. 2A and 2B, button 102 comprises a button top 212, a button stem 220, and a button post 210. Button top 212 extends from internal cavity 202 through aperture 130 such that button top 212 is externally accessible with respect to housing 106. In an alternate embodiment, button top 212 extends into aperture 130 but some or all of button top 212 does not extend all the way through it; however, in this alternate embodiment, at least a portion of button top 212 is nevertheless externally accessible with respect to housing 106. In contrast, button stem 220 and button post 210 are fully disposed within internal cavity 202. Button stem 220 includes a protuberance 224 that causes button 102 to be wider than aperture 130 of housing 106, such that button 102 cannot pass through aperture 130 and fall out of housing 106 despite an outward force that is applied thereto by button biasing mechanism 214.

Button depression guide 204 is disposed within internal cavity 202 of user input device 100. Button depression guide 204 engages with button stem 220 to cause button 102 to move from a default position and along a substantially arc-shaped path when pressure is applied to button top 212. In an embodiment, such movement is around an axis of rotation. In a further embodiment, such axis of rotation is external to user input device 100.

In the embodiment shown in FIGS. 2A and 2B, button stem 220 includes a first cylindrically-shaped pin 218A and a second cylindrically-shaped pin 218B that extend from a first side 220A of button stem 220. In further accordance with this embodiment, button depression guide 204 comprises a first groove-defining member 206 that extends from a first portion 226A of a wall 226 of internal cavity 202. First groove-defining member 206 has arc-shaped fins that define a substantially arc-shaped groove 222A through which first cylindrically-shaped pin 218A and second cylindrically-shaped pin 218B are guided when pressure is applied to button top 212. It should be noted that while in FIGS. 2A and 2B groove 222A of button based control mechanism 200 extends all the way through first groove-defining member 206, in other embodiments, groove 222A may be a blind-groove penetrating only partially through first groove-defining member 206.

Button stem 220 further includes a third cylindrically-shaped pin 228A and a further cylindrically-shaped pin 228B that extend from a second side 220B of button stem 220 that is opposite to first side 220A of button stem 220. Button depression guide 204 further comprises a second groove-defining member 216 that extends from a second portion 226B of wall 226 of internal cavity 202. Second groove-defining member 216 has arc-shaped fins that define a substantially arc-shaped groove 222B through which third cylindrically-shaped pin 228A and fourth cylindrically-shaped pin 228B are guided when pressure is applied to button top 212. It should be noted that while in FIGS. 2A and 2B groove 222B of button based control mechanism 200 extends all the way through second groove-defining member 216, in other embodiments, groove 222B may be a blind-groove penetrating only partially through second groove-defining member 216.

First cylindrically-shaped pin 218A, second cylindrically-shaped pin 218B, third cylindrically-shaped pin 228A and fourth cylindrically-shaped pin 228B may each be connected to or integrated with button stem 220 in a variety of different ways. In the embodiment shown in FIGS. 2A and 2B, first cylindrically-shaped pin 218A and third cylindrically-shaped pin 228A comprise opposite ends of a first cylindrically-shaped rod 232A that extends through a first aperture 304A (see FIG. 3) in button stem 220 and second cylindrically-shaped pin 218B and fourth cylindrically-shaped pin 228B comprise opposite ends of a second cylindrically-shaped rod 232B that extends through a second aperture 304B (see FIG. 3) in button stem 220. In another embodiment, button stem 220 and cylindrically-shaped pins 218A, 218B, 228A, 228B may be formed as a single part (e.g., through injection molding).

In an embodiment, button based control mechanism 200, first groove-defining member 206, second groove-defining member 216, and post 208 are integrally formed into bottom portion 104 of housing 106 (e.g., through injection molding). In other embodiments, these features may be formed by one or more additional parts attached directly or through intermediate parts to housing 106 through any suitable manner including screws, snaps, adhesive, etc. These features may be formed from any suitable material including plastic (e.g., through injection molding), rubber, metal, composites, or a combination of metals/alloys, etc. Specifically, in some embodiments one or both of first groove-defining member 206 and second groove-defining member 216 may be formed from two or more parts wherein one part forms the bottom side of groove 222A and/or groove 222B and another part forms the top side of groove 222A and/or groove 222B.

In accordance with the present embodiment, when button top 212 is depressed, the pins extending from button stem 220 are guided by first groove-defining member 206 and second groove-defining member 216, respectively, along the substantially arc-shaped path defined by their respective grooves. As noted above, each groove is substantially arc-shaped, and the arc defined thereby may have an axis of rotation that lies outside the user input device 100 (discussed in detail hereinafter).

In button based control mechanism 200, button depression guide 204 has two halves—one on either side of button stem 220 (e.g., cylindrical pins 218A and 218B and groove 222A in front of button stem 220 and cylindrical pins 228A and 228B and groove 222B behind button stem 220). By having a portion on either side of button 102, the stability and smoothness of motion of button 102 is improved. In other embodiments, button depression guide 204 may comprise only one groove and set of pins. In yet other embodiments, button depression guide 204 may comprise two or more button stems similar to button stem 220 each holding one end of cylindrically-shaped rod 232A and cylindrically-shaped rod 232B with a single groove such as groove 222A between the two button stems.

As shown in FIGS. 2A and 2B, button post 210 extends away from button top 212 toward internal cavity 202. A post 208 is affixed to and extends from wall 226 of internal cavity 202 toward button post 208. Button biasing mechanism 214 comprises a spring that is connected between button post 210 and a post 208. Button biasing mechanism 214 causes button 102 to return to its default position when pressure is removed from button top 212. For example, when button top 212 is depressed, button post 210 moves in the direction of post 208, thereby compressing button biasing mechanism 214. When button top 212 is no longer depressed, button biasing mechanism 214 expands, thereby forcing button 102 back into its default position. In some embodiments, button biasing mechanism 214 may be designed in a manner such that even when button 102 is in its default position button biasing mechanism 214 still exerts a force on button 102 such that when a user pressing on button top 212 immediately feels resistance rather than button 802 initially feeling loose and increasing in resistance as button 102 is depressed. For example, the spring within button biasing mechanism 204 may be partially compressed when installed within button based control mechanism 200. As noted above, protuberance 224 on button stem 220 will collide with housing 106 when button 102 is moving back to its default position, thereby prevent button 102 from passing all the way through aperture 130 and out of housing 106 entirely. In an alternate embodiment, button-biasing mechanism 204 comprises a spring that is positioned differently than what is shown in FIGS. 2A and 2B. For example, in one alternate embodiment, the spring may be placed between a bottom of button post 210 and inner wall 226 of internal cavity 202. However, this example is not intended to be limiting and other spring placements may be utilized. Although button biasing mechanism 214 within button based control mechanism 200 comprises a coil spring, in other embodiment button biasing mechanism 214 may be formed in any suitable manner from a part or mechanism that expands to push button 102 to its default position. For example, button biasing mechanism 214 may be formed from rubber or foam.

In an embodiment, button-based control mechanism 200 includes at least one sensor (not shown) that is disposed within internal cavity 202. Such sensor(s) may operate to detect actuation of button 102 responsive to movement of button 102 away from its default position. Such sensor(s) may comprise, for example and without limitation, a tact switch, a detector switch, a magnetic sensor, a potentiometer, a capacitive sensor, or a Hall effect sensor. Such sensor(s) may detect a simple binary actuation of button 102 (i.e., pressed or not pressed) or may measure a degree of depression of button 102. Such sensor(s) may also include, for example and without limitation, a force transducer that measures a force applied via depression of button 102. Such sensor(s) may be placed or affixed in suitable locations within internal cavity 202 to perform their respective sensing functions. For example, and without limitation, a sensor may be located beneath button stem 220, at a base or side of first groove-defining member 206 and/or second groove-defining member 216, or the like. In another embodiment, a capacitive touch sensor may be incorporated into button top 212 to detect user interaction therewith. The output of such sensor(s) may be used as input to an application or other device that is being controlled by user input device 100, and such input may be used to control such application or other device. For example, the sensed actuation of button 102 may cause an object to be picked up and/or carried in a virtual reality simulation, although this is only one of a vast multitude of potential control outcomes.

Figure 2C:
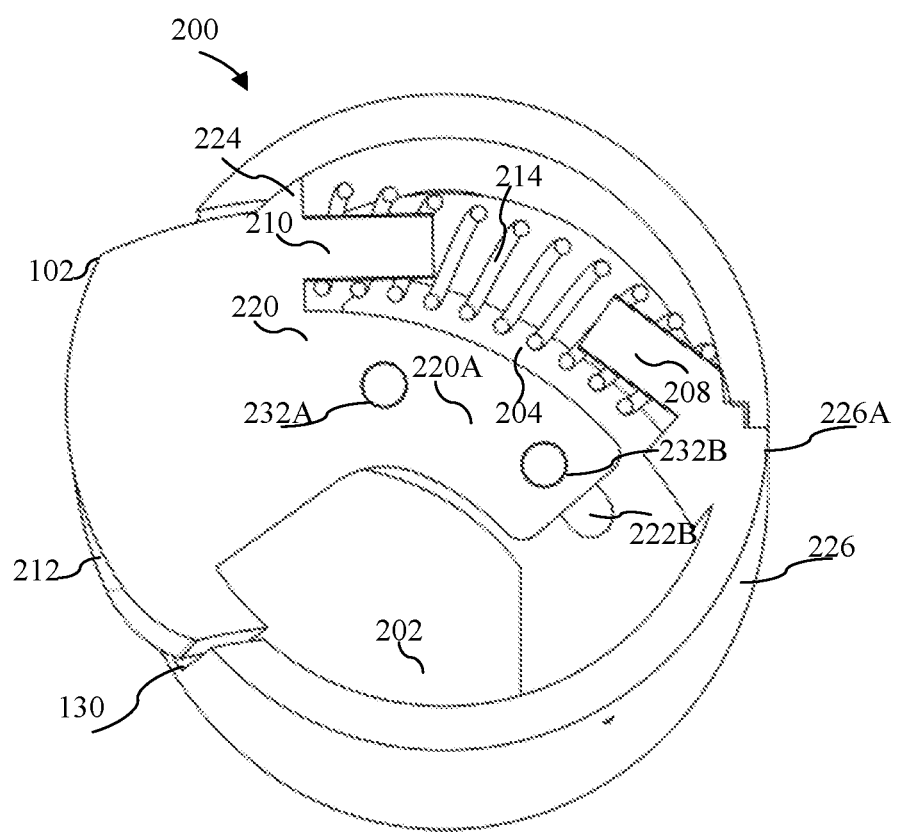
FIG. 2C shows a cross-sectional perspective view of the button-based control mechanism of FIGS. 2A and 2B.

FIG. 2C shows a cross-sectional perspective view of the portion of button-based control mechanism 200 of FIGS. 2A and 2B. As shown in FIG. 2C, button stem 220 is disposed within internal cavity 202 while button top 212 extends through (or alternatively, into) aperture 130. Aperture 130 has a shape that closely accommodates the passage of button top 212 to ensure that there is little or no movement of button 102 in any direction other than into or out of internal cavity 202 when the user is interacting with button 102. Alternatively or additionally, other mechanisms can be used to help avoid such movement including mechanisms that prevent side-to-side movement of button stem 220 such as an internal guide track or a vertical plate. As also shown in FIG. 2C, interaction between protuberance 224 on button stem 220 and housing 106 ensures that button 102 cannot be ejected out of housing 106 by button biasing mechanism 214. FIG. 2C further shows how first cylindrically-shaped rod 232A and second cylindrically-shaped rod 232B pass through button stem 220.

Figure 3:
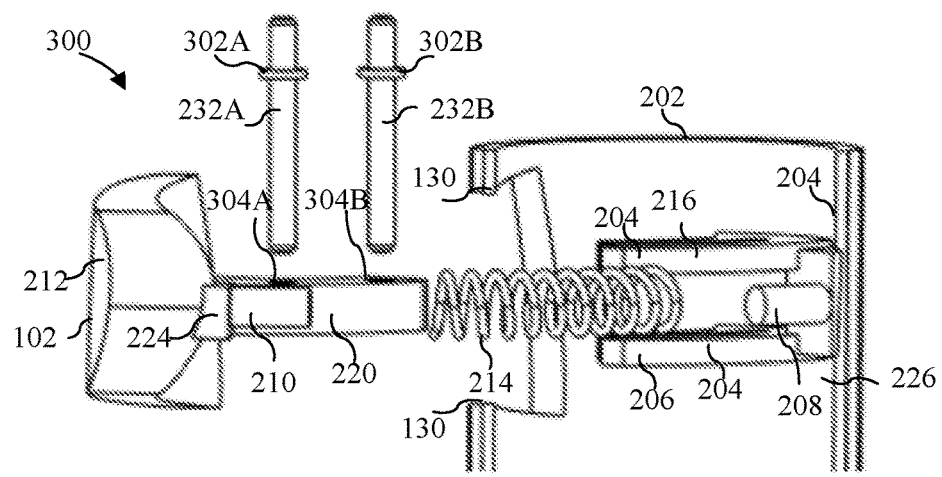
FIG. 3 shows an exploded view of the button-based control mechanism of FIGS. 2A and 2B.

To further illustrate this embodiment, FIG. 3 shows an exploded view 300 of button-based control mechanism 200 of FIGS. 2A and 2B. As shown in FIG. 3, button 102 includes button top 212, button stem 220 and button post 210. Button stem 220 is disposed within internal cavity 202 of housing 106 (FIGS. 1A and 1B) and internal cavity 202 includes wall 226 of internal cavity 202. Post 208 extends from wall 226 of internal cavity 202 and is connected to button post 210 via button biasing mechanism 214. In this embodiment, button biasing mechanism 214 comprises a spring. As further shown in FIG. 3, first groove-defining member 206 and second groove-defining member 216 extend from wall 226 of internal cavity 202 to interact with button stem 220. For instance, first cylindrically-shaped rod 232A is disposed through first aperture 304A of button stem 220 and second cylindrically-shaped rod 232B is disposed through second aperture 304B of button stem 220. A first flange 302A and a second flange 302B, respectively, hold first cylindrically-shaped rod 232A and second cylindrically-shaped rod 232B into place in button stem 220. In an embodiment, first and second cylindrically-shaped rods 232A, 232B are not as wide as first and second apertures 304A, 304B which enables first and second cylindrically-shaped rods 232A, 232B to rotate within grooves 206 and 216 as button 102 is depressed. This has the beneficial effect of reducing surface area interaction between button stem 220 and the fins of first groove-defining member 206 and second groove-defining member 216.

Figure 4A:
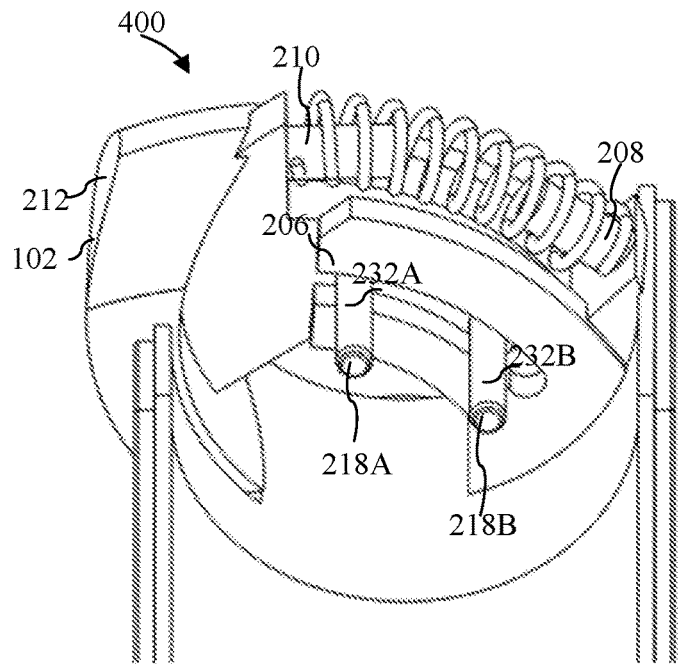
FIG. 4A shows a perspective view of the button-based control mechanism of FIGS. 2A and 2B in an unactuated state.
Figure 4B:
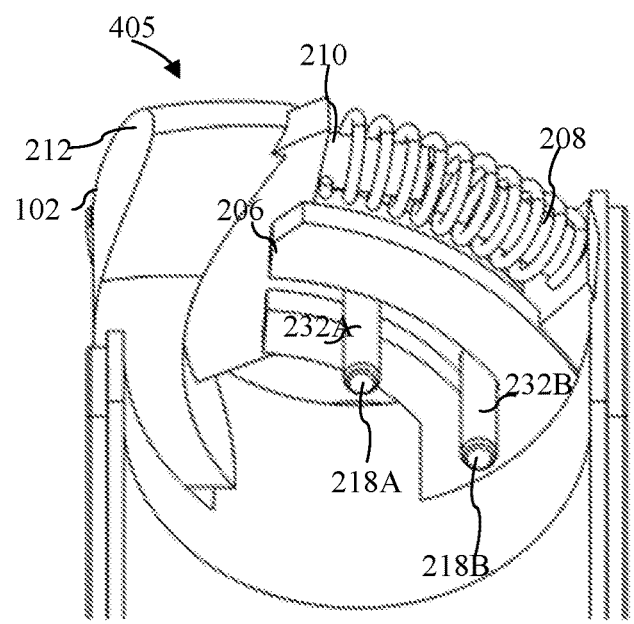
FIG. 4B shows a perspective view of the button-based control mechanism of FIGS. 2A and 2B in an actuated state.

As previously discussed, button 102 can be depressed from a default position to many different positions, including a fully-depressed position. FIG. 4A shows a perspective view 400 of the button-based control mechanism 200 of FIGS. 2A and 2B in which button 102 is not depressed. This is the default position for button 102. FIG. 4B shows a perspective view 405 of button-based control mechanism 200 of FIGS. 2A and 2B in which button 102 is depressed. In this position, button top 212 is depressed thus moving button post 210 towards post 208 and compressing button biasing mechanism 214. Furthermore, first cylindrically-shaped rod 232A (which comprises first cylindrically-shaped pin 218A and third cylindrically-shaped pin 228A) and second cylindrically-shaped rod 232B (which comprises second cylindrically-shaped pin 218B and fourth cylindrically-shaped pin) are guided through the substantially arc-shaped grooves defined by first groove-defining member 206 and second groove defining member 216, respectively. As previously discussed, this arc-shaped movement may be around a simulated axis of rotation that is located outside of user input device 106. In an embodiment in which the rods are not as wide as the grooves, there may be some variance to the arc-shaped path.

Figure 5A:
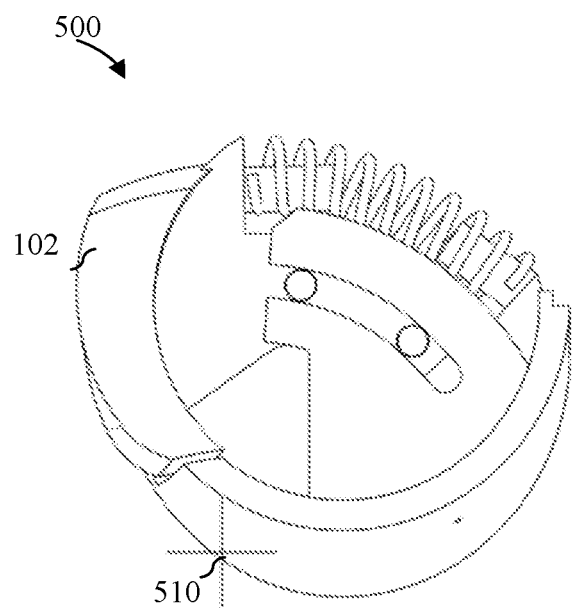
FIGS. 5A and 5B show additional perspective views of the button-based control mechanism of FIGS. 2A and 2B that include an axis of rotation associated with the button-based control mechanism.
Figure 5B:
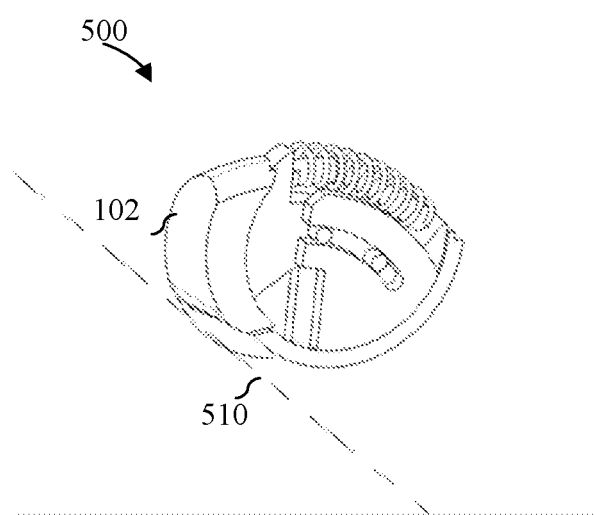

FIGS. 5A and 5B show additional perspective views of button-based control mechanism 200 of FIGS. 2A and 2B that include an axis of rotation about which button 102 may move when it is depressed. As shown in FIGS. 5A and 5B, when button 102 is depressed, it will move along an arc-shaped path and about an axis of rotation 510 that is located outside user input device 100. Such motion will enable a user of user input device 100 to interact with button 102 in a manner that feels natural and that accords with the biomechanics of the user's hand. However, this example is not intended to be limiting and, in alternative embodiments, the arc associated with the arc-shaped path may have an axis of rotation that is internal to user input device 100. Moreover, the path along which button 102 is depressed is not necessarily limited to an arc-shaped path but may include any non-linearly-shaped path. For example, the non-linear path may have any type of curvilinear shape. Furthermore, the non-linear path may include a combination of any number of linear segments and have any number of non-linear segments.

B. Example Button-Based Control Mechanism with Guided Panel and Spring

While the above-described button-based control mechanism 200 allows for the depression of a button around a simulated axis of rotation, alternative designs may be used to achieve the same or similar functionality. One such alternative design that uses a guided panel and spring will now be described in reference to FIGS. 6A and 6B.

Figure 6A:
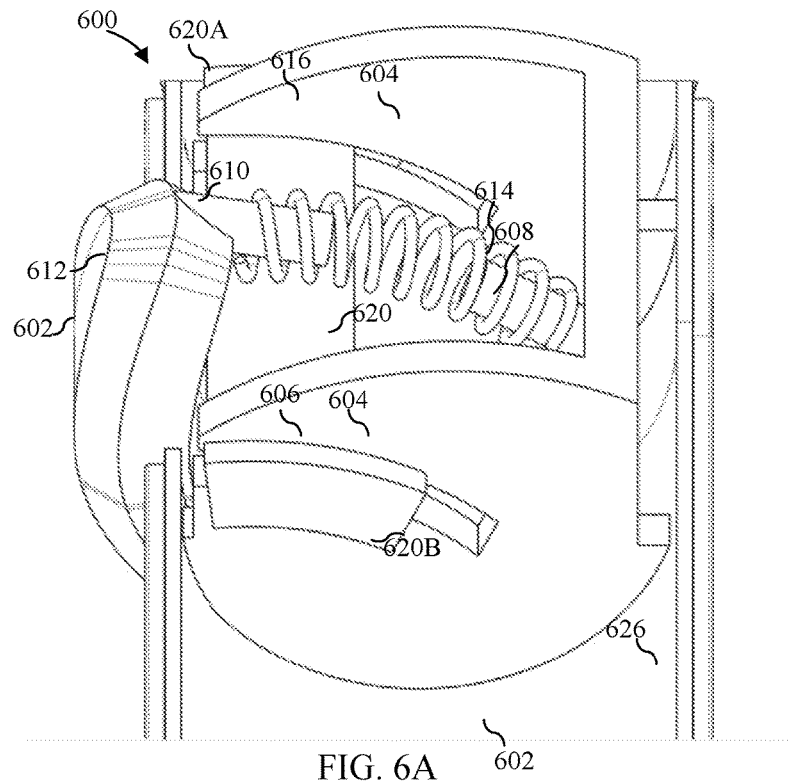
FIGS. 6A and 6B show perspective views of a first alternative button-based control mechanism for a user input device, according to an example embodiment.
Figure 6B:
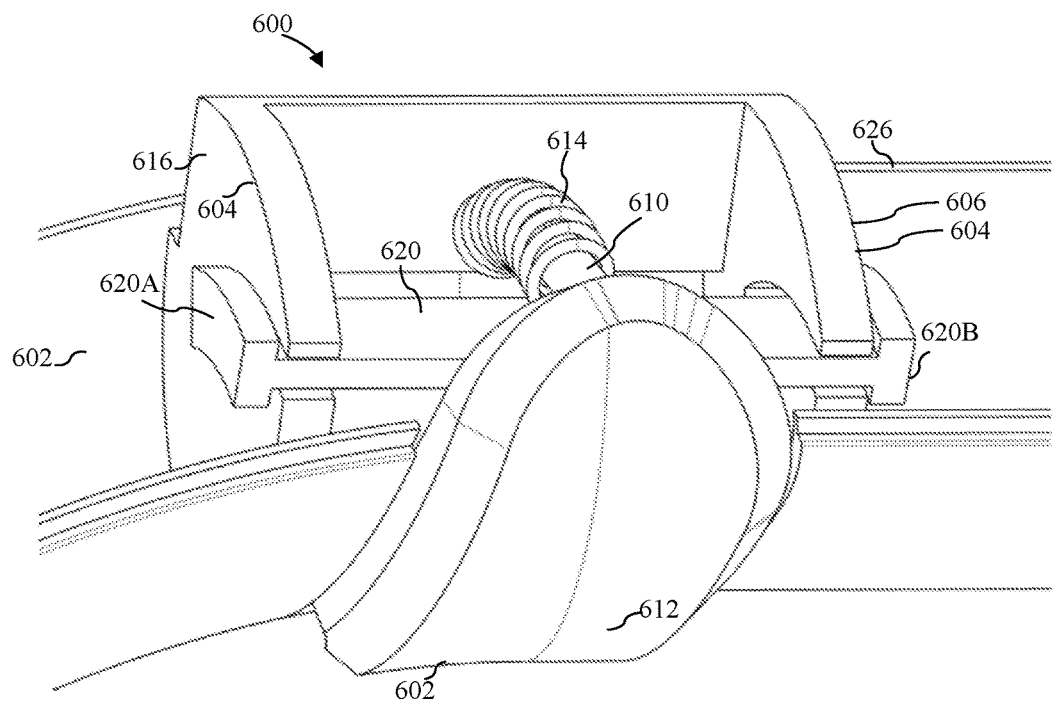

In particular, FIGS. 6A and 6B show perspective views of a button-based control mechanism 600 that includes a button 602, a button depression guide 604, and a button biasing mechanism 614. Button 602 includes a button top 612, a button stem 620, and a button post 610. Button post 610 extends into an internal cavity 602 of the user input device and is connected via button biasing mechanism 614 to a post 608 that extends from an inner wall 626 of internal cavity 602. In this embodiment, button biasing mechanism 614 also comprises a spring. Furthermore, as shown in FIGS. 6A and 6B, button stem 620 comprises a curved panel 620 that is guided through substantially arc-shaped grooves defined by a first groove-defining member 606 and a second groove-defining member 616 when pressure is applied to button top 612. In this embodiment, first groove-defining member 606 and second groove defining member 616 comprise interior walls formed within internal cavity 602. As further shown in FIGS. 6A and 6B, curved panel 620 includes a first wing 620A at a first end thereof and a second wing 620B at a second end thereof that is opposite the first end. These wings secure curved panel 620 to first groove defining member 606 and second groove defining member 616.

In button based control mechanism 600, curved panel 620 is integrally formed into button 602 (e.g., through injection molding). In other embodiments, curved panel 620 may be formed by one or more additional parts attached to button 602 through any suitable manner including screws, snaps, adhesive, etc. Curved panel 620 may be formed from any suitable material including plastic (e.g., through injection molding), rubber, metal, composites, or a combination of metals/alloys, etc.

When a user applies pressure to button top 612, button depression guide 604 engages with button stem 620 to cause button 602 to move from a default position and along a substantially arc-shaped path. The substantially arc-shaped path may be around an axis of rotation. In an embodiment, such axis of rotation may be external to the user input device that includes button-based control mechanism 600.

In an embodiment, button-based control mechanism 600 may include one or more sensors, including any of the sensors that were previously described in reference to button-based control mechanism 200. Such sensor(s) may operate to detect actuation of button 602 responsive to movement of button 602 away from its default position. Such sensor(s) may detect a simple binary actuation of button 602 (i.e., pressed or not pressed) or may measure a degree of depression of button 602. Such sensor(s) may also include, for example and without limitation, a force transducer that measures a force applied via depression of button 602. Such sensor(s) may be placed or affixed in suitable locations within internal cavity 602 to perform their respective sensing functions.

C. Example Button-Based Control Mechanism with Guided Pins and Leaf Spring

Figure 7A:
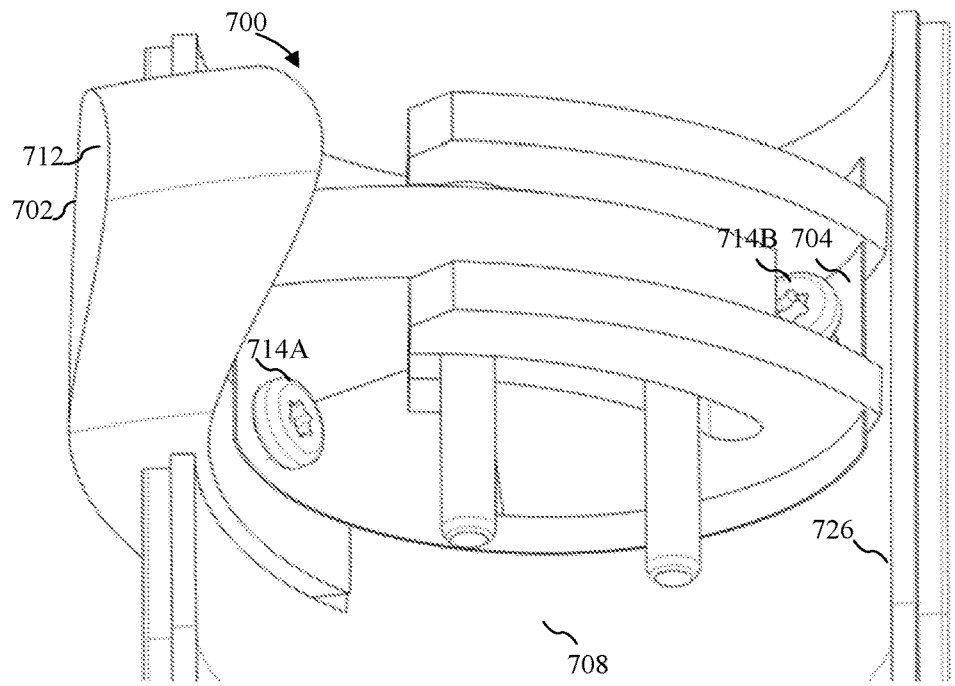
FIGS. 7A and 7B show perspective views of a second alternative button-based control mechanism for a user input device, according to an example embodiment.
Figure 7B:
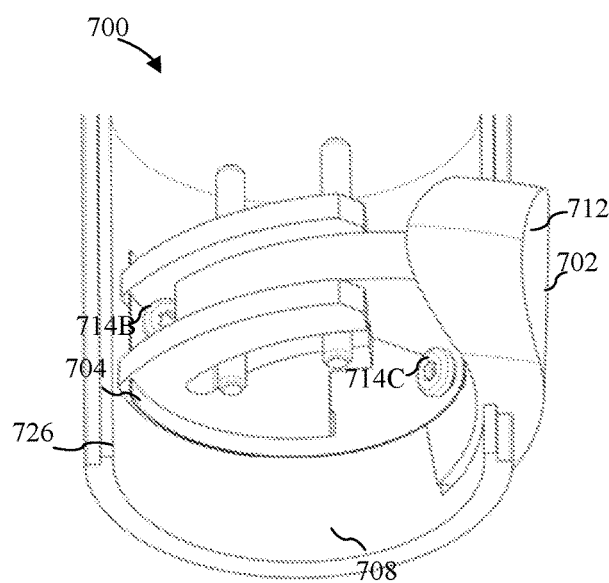

FIGS. 7A and 7B show perspective views of another button-based control mechanism 700 that allows for the depression of a button around a simulated axis of rotation, in accordance with an embodiment. Button-based control mechanism 700 utilizes guided pins in much the same manner as button-based control mechanism 200 and thus those aspects of button-based control mechanism 700 that relate to such guided pins will not be repeated here for the sake of brevity. However, button-based control mechanism 700 differs from button-based control mechanism 200 in that button-based control mechanism 700 includes a button biasing mechanism 704 in the form of a leaf spring that is attached to a button 702 and an inner wall 726 of an internal cavity 708 of the user input device. The leaf spring is affixed to button 702 via a screw 714A and a screw 714C and is affixed to inner wall 726 via a screw 714B. However, this example is not intended to be limiting and other means may be used to attach the leaf spring to button 702 and inner wall 726 such as insert molding, heat-staking, adhesive, an additional clamping part, etc. When a user applies sufficient pressure to a button top 712 of button 702, the leaf spring will fold inward, allowing button 702 to be depressed. However, when pressure is removed from button top 712, the leaf spring will spring back towards its original shape, thus returning button 702 to its default position.

In some embodiments, button biasing mechanism 704 maybe be designed such that even when button 702 is in its default position button biasing mechanism 704 still exerts a force on button 702 such that a user pressing on button top 712 immediately feels resistance rather than button 702 initially feeling loose and increasing in resistance as button 702 is depressed. For example, the leaf spring within button biasing mechanism 704 may be flexed from its natural state when installed within button-based control mechanism 700. Button biasing mechanism 704 may be made out of any suitable material including sheet metal (ex. stamped steel), plastic (especially a resin with good fatigue properties such as polypropylene, acetal, or a PC-PBT blend), rubber, composites, etc. In some embodiments, button 702 and button biasing mechanism 704 may be formed as a single component (e.g., through injection molding).

D. Example Button-Based Control Mechanism with Guided Pins and Torsion Spring

Figure 8:
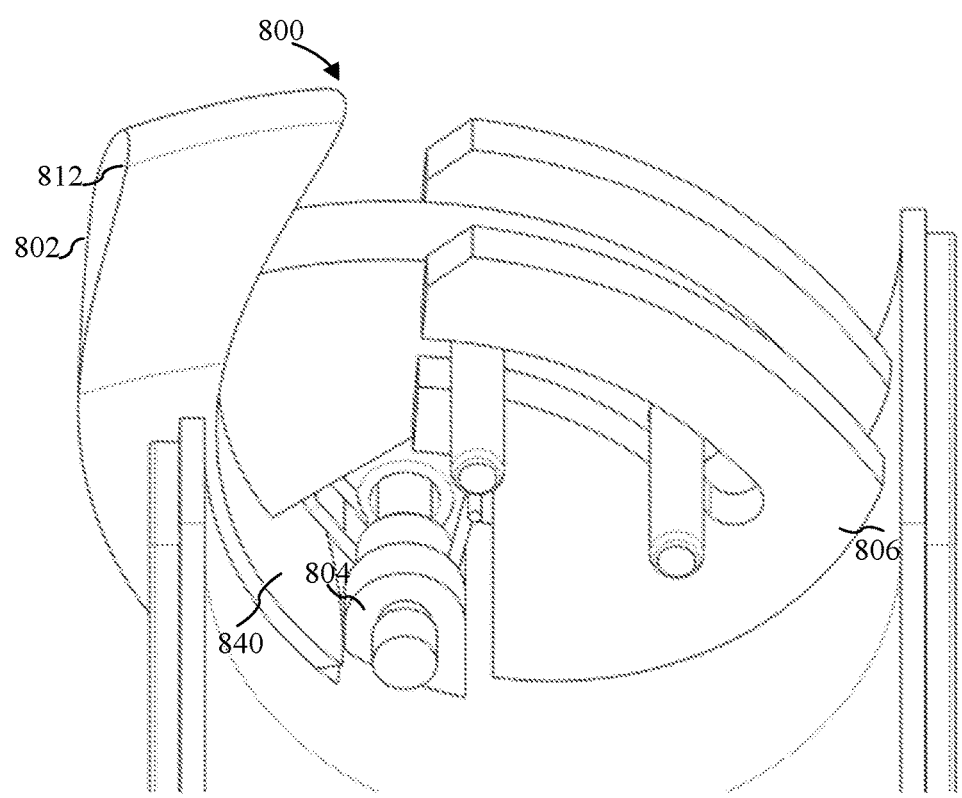
FIG. 8 shows a perspective view of third alternative button-based control mechanism for a user input device, according to an example embodiment.

FIG. 8 shows a perspective view of another button-based control mechanism 800 that allows for the depression of a button around a simulated axis of rotation, in accordance with an embodiment. Button-based control mechanism 800 utilizes guided pins in much the same manner as button-based control mechanism 200 and thus those aspects of button-based control mechanism 800 that relate to such guided pins will not be repeated here for the sake of brevity. However, button-based control mechanism 800 differs from button-based control mechanism 200 in that button-based control mechanism 800 includes a button biasing mechanism 804 in the form of a torsion spring that is positioned between a bottom surface 840 of a button top 812 of a button 802 and a groove defining member 806. When a user applies sufficient pressure to button top 812 of button 802, the torsion spring will fold inward, allowing button 802 to be depressed. However, when pressure is removed from button top 812, the torsion spring will spring back to its original shape, thus returning button 802 to its default position.

In some embodiments, button biasing mechanism 804 maybe be designed such that even when button 802 is in its default position button biasing mechanism 804 still exerts a force on button 802 such that a user pressing on button top 812 immediately feels resistance rather than button 802 initially feeling loose and increasing in resistance as button 802 is depressed. For example, the torsion spring within button biasing mechanism 804 may be twisted from its natural state when installed within button-based control mechanism 800.

E. Example Button-Based Control Mechanism with Guided Pins and Resilient Plugs

Figure 9:
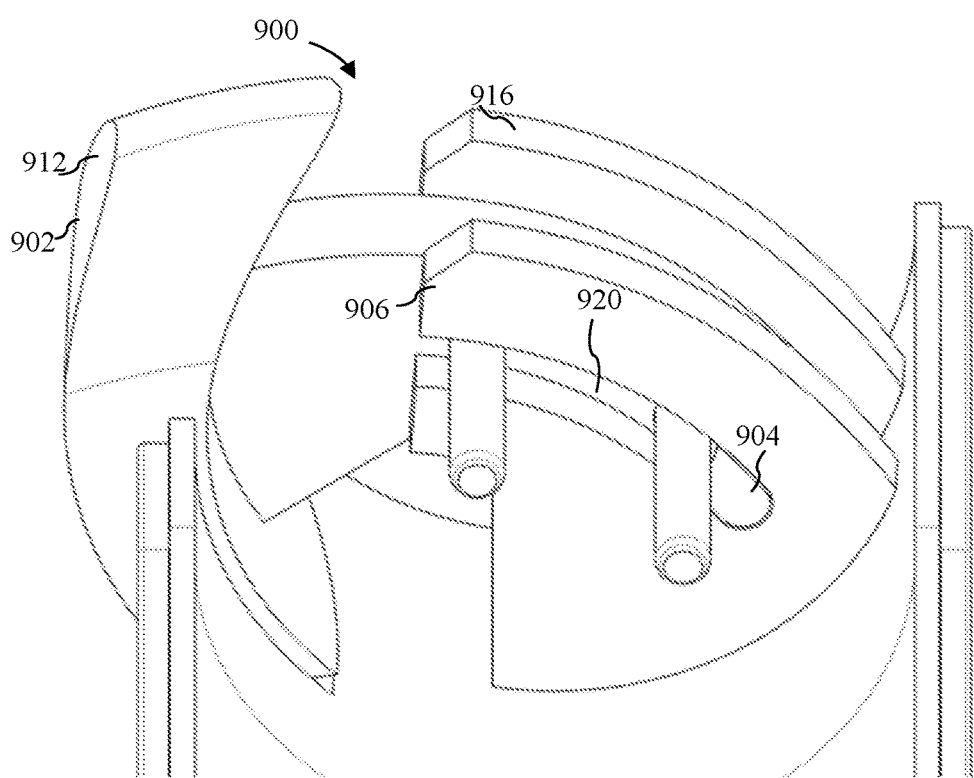
FIG. 9 shows a perspective view of a fourth alternative button-based control mechanism for a user input device, according to an example embodiment.

FIG. 9 shows a perspective view of another button-based control mechanism 900 that allows for the depression of a button around a simulated axis of rotation, in accordance with an embodiment. Button-based control mechanism 900 utilizes guided pins in much the same manner as button-based control mechanism 200 and thus those aspects of button-based control mechanism 900 that relate to such guided pins will not be repeated here for the sake of brevity. However, button-based control mechanism 900 differs from button-based control mechanism 200 in that button-based control mechanism 800 includes a button biasing mechanism 904 in the form of a first resilient plug that is positioned at a base of a groove defined by a first groove defining member 906. In an embodiment, although not shown in FIG. 9, an additional resilient plug may be placed at a base of a groove defined by a second groove-defining member 916. The resilient plug(s) may be formed from foam, rubber, or any other resilient material that can be deformed under pressure and that will return to its original form once pressure has been removed. When a user applies sufficient pressure to a button top 912 of a button 902, the bottom-most pins attached to a button stem 920 of button 902 will press down on and deform the resilient plug(s), allowing button 902 to be depressed. However, when pressure is removed from button top 912, the resilient plug(s) will return to their original shape, thus pushing button 902 back to its default position.

F. Additional Configurations of Button Based Control Mechanism

In embodiments, and as previously discussed, alternative designs of the previously-described button-based control mechanism exist that may be used to achieve the same or similar functionality. These alternative designs may include alternative configurations of the button and the button depression guide such that interaction therebetween causes the button to be guided along a non-linear (e.g., arc-shaped) path from a default position when pressure is applied to a button top of button. Each of the button and the button depression guide may be formed as a single component or by two or more connected or interlocking parts and may be configured in many different ways. Furthermore, each of the button and the button depression guide may be made from any suitable material(s), including plastic (e.g., through injection molding), rubber, metal, composites, or a combination of metals/alloys, etc.

For example, in one embodiment, the button stem may comprise a curved portion and the button depression guide may comprise a plurality of pins (or other protuberances) that extend from one or more interior surfaces of the user input device and around the curved portion of the button stem. The pins may be arranged so as to define a curved channel through which the curved portion of the button stem is guided when pressure is applied to the button top.

In another embodiment, the button stem may comprise one or more portions that define a curved channel and the button depression guide may comprise one or more pins, fins, or other protuberances that extend from one or more interior surfaces of the user input device and into or through the curved channel. The protuberance(s) that extend from the interior surface(s) may be guided through the curved channel defined by the portion(s) of the button stem when pressure is applied to the button top. In one such embodiment, the button stem comprises a plurality of pins that extend from at least one side thereof and that define a curved channel through which a curved fin that extends from an interior surface of the user input device is guided when pressure is applied to the button top. In another such embodiment, the button stem includes a curved channel (e.g., a groove) defined therein through which a curved fin that extends from an interior surface of the user input device is guided when pressure is applied to the button top. In yet another such embodiment, the button stem includes a curved channel (e.g., a groove) defined therein through a plurality of pins that extend from an interior surface of the user input device are guided when pressure is applied to the button top. Still other configurations are possible.

Although this section refers to the movement of the button through an arc-shaped path, persons skilled in the relevant art(s) will appreciate that the foregoing techniques may be used to cause the button to move along any non-linearly-shaped path.

IV. Additional Example Embodiments

A user input device is described herein. The user input device comprises: a housing that defines an internal cavity of the user input device and includes an aperture; and a button-based control mechanism, comprising: a button that comprises a button top and a button stem, the button top extending into or through the aperture in the housing such that the button top is externally accessible with respect to the housing, the button stem being disposed within the internal cavity of the user input device; a button depression guide disposed within the internal cavity of the user input device that engages with the button stem to cause the button to move from a default position and along a substantially arc-shaped path when pressure is applied to the button top, the substantially arc-shaped path being around an axis of rotation that is external to the user input device; a button biasing mechanism disposed within the internal cavity that returns the button to the default position when the pressure is removed from the button top; and at least one sensor that detects actuation of the button responsive to movement of the button away from the default position.

In one embodiment of the foregoing user input device, the button stem comprises a first cylindrically-shaped pin and a second cylindrically-shaped pin that extend from a first side thereof, and the button depression guide comprises a first groove-defining member that extends from a first portion of a wall of the internal cavity, the first groove-defining member defining a substantially arc-shaped groove through which the first cylindrically-shaped pin and the second cylindrically-shaped pin are guided when the pressure is applied to the button top.

In another embodiment of the foregoing user input device, the button stem further comprises a third cylindrically-shaped pin and a fourth cylindrically-shaped pin that extend from a second side of the button stem that is opposite to the first side of the button stem, and the button depression guide further comprises a second groove-defining member that extends from a second portion of the wall of the internal cavity, the second groove-defining member defining a substantially arc-shaped groove through which the third cylindrically-shaped pin and the fourth cylindrically-shaped pin are guided when the pressure is applied to the button top.

In yet another embodiment of the foregoing user input device, the first cylindrically-shaped pin and the third cylindrically-shaped pin comprise opposite ends of a first cylindrically-shaped rod that extends through a first aperture in the button stem and the second cylindrically-shaped pin and the fourth cylindrically-shaped pin comprise opposite ends of a second cylindrically-shaped rod that extends through a second aperture in the button stem.

In still another embodiment of the foregoing user input device, the button depression guide comprises a first groove-defining member that extends from a first portion of a wall of the internal cavity and defines a first groove and a second groove-defining member that extends from a second portion of the wall of the internal cavity and defines a second groove, the first and second grooves each being substantially arc-shaped, and the button stem comprises an arc-shaped panel having a first end that extends through and is moveable within the first groove and a second end that extends through and is moveable within the second groove.

In still another embodiment of the foregoing user input device, the button further comprises a button post that is disposed within the internal cavity and the button biasing mechanism comprises a spring that is connected between the button post and a post that is affixed to a wall of the internal cavity.

In still another embodiment of the foregoing user input device, the button biasing mechanism comprises one of: a sheet metal spring; a torsion spring; or one or more resilient plugs.

In still another embodiment of the foregoing user input device, the at least one sensor comprises a force transducer that measures a force applied thereto via the button.

In still another embodiment of the foregoing user input device, the at least one sensor comprises at least one of: a tact switch; a detector switch; a magnetic sensor; a potentiometer; a capacitive sensor; or a hall sensor.

Another user input device is described herein. The user input device, comprises: a housing that defines an internal cavity of the user input device and includes an aperture; and a button-based control mechanism, comprising: a button that comprises a button top and a button stem, the button top extending into or through the aperture in the housing such that the button top is externally accessible with respect to the housing, the button stem being disposed within the internal cavity of the user input device; a button depression guide disposed within the internal cavity of the user input device that engages with the button stem to cause the button to move from a default position and along a substantially arc-shaped path when pressure is applied to the button top; a button biasing mechanism disposed within the internal cavity that causes the button to return the default position when the pressure is removed from the button top; and at least one sensor that detects actuation of the button responsive to movement of the button away from the default position.

In one embodiment of the foregoing user input device, the button stem comprises a first cylindrically-shaped pin and a second cylindrically-shaped pin that extend from a first side thereof, and the button depression guide comprises a first groove-defining member that extends from a first portion of a wall of the internal cavity, the first groove-defining member defining a substantially arc-shaped groove through which the first cylindrically-shaped pin and the second cylindrically-shaped pin are guided when the pressure is applied to the button top.

In another embodiment of the foregoing user input device, the button stem further comprises a third cylindrically-shaped pin and a fourth cylindrically-shaped pin that extend from a second side of the button stem that is opposite to the first side of the button stem, and the button depression guide further comprises a second groove-defining member that extends from a second portion of the wall of the internal cavity, the second groove-defining member defining a substantially arc-shaped groove through which the third cylindrically-shaped pin and the fourth cylindrically-shaped pin are guided when the pressure is applied to the button top.

In yet another embodiment of the foregoing user input device, the first cylindrically-shaped pin and the third cylindrically-shaped pin comprise opposite ends of a first cylindrically-shaped rod that extends through a first aperture in the button stem and the second cylindrically-shaped pin and the fourth cylindrically-shaped pin comprise opposite ends of a second cylindrically-shaped rod that extends through a second aperture in the button stem.

In still another embodiment of the foregoing user input device, the button depression guide comprises a first groove-defining member that extends from a first portion of a wall of the internal cavity and defines a first groove and a second groove-defining member that extends from a second portion of the wall of the internal cavity and defines a second groove, the first and second grooves being substantially arc-shaped, and the button stem comprises an arc-shaped panel having a first end that extends through and is moveable within the first groove and a second end that extends through and is moveable within the second groove.

In still another embodiment of the foregoing user input device, the button further comprises a button post that is disposed within the internal cavity and the button biasing mechanism comprises a spring that is connected between the button post and a post that is affixed to a wall of the internal cavity.

In still another embodiment of the foregoing user input device, the button biasing mechanism comprises one of: a sheet metal spring; a torsion spring; or one or more resilient plugs.

In still another embodiment of the foregoing user input device, the at least one sensor comprises at least one of: a tact switch; a detector switch; a magnetic sensor; a potentiometer; a capacitive sensor; or a hall sensor.

In still another embodiment of the foregoing user input device, the at least one sensor comprises a force transducer that measures a force applied thereto via the button.

Another user input device is described herein. The user input device comprises: a housing that defines an internal cavity of the user input device and includes an aperture; and a button-based control mechanism, comprising: a button that comprises a button top and a button stem, the button top extending into or through the aperture in the housing such that the button top is externally accessible with respect to the housing, the button stem being disposed within the internal cavity of the user input device and comprising a first and second cylindrically-shaped pin that extend from a first side thereof and a third and fourth cylindrically-shaped pin that extend from a second side of the button stem that is opposite to the first side of the button stem; a button depression guide disposed within the internal cavity of the user input device that engages with the button stem to cause the button to move from a default position and along a non-linear path when a user presses on the button top, the button depression guide comprising a first groove-defining member defining a non-linear groove through which the first and second cylindrically-shaped pins are guided when pressure is applied to the button top and a second groove-defining member that extends from a second portion of the wall of the internal cavity defining a non-linear groove through which the third and fourth cylindrically-shaped pins are guided when the pressure is applied to the button top; a button biasing mechanism disposed within the internal cavity that causes the button to return the default position when the pressure is removed from the button top; and at least one sensor that detects actuation of the button responsive to movement of the button away from the default position.

In another embodiment of the foregoing system, the non-linear path includes at least one arc.

V. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A user input device, comprising:
a housing that defines an internal cavity of the user input device and includes an aperture; and
a button-based control mechanism, comprising:
a button that comprises a button top and a button stem, the button top extending into or through the aperture in the housing such that the button top is externally accessible with respect to the housing, the button stem being disposed within the internal cavity of the user input device;
a button depression guide that is disposed within the internal cavity of the user input device that engages with the button stem to cause the button to move from a default position and along a substantially arc-shaped path when pressure is applied to the button top, the substantially arc-shaped path being around an axis of rotation that is external to the user input device;
a button biasing mechanism disposed within the internal cavity that returns the button to the default position when the pressure is removed from the button top; and
at least one sensor that detects actuation of the button responsive to movement of the button away from the default position.

2. The user input device of claim 1, wherein the button stem comprises a first cylindrically-shaped pin and a second cylindrically-shaped pin that extend from a first side of the button stem, and wherein the button depression guide comprises a first groove-defining member that extends from a first portion of a wall of the internal cavity, the first groove-defining member defining a substantially arc-shaped groove through which the first cylindrically-shaped pin and the second cylindrically-shaped pin are guided when the pressure is applied to the button top.

3. The user input device of claim 2, wherein the button stem further comprises a third cylindrically-shaped pin and a fourth cylindrically-shaped pin that extend from a second side of the button stem that is opposite to the first side of the button stem, and wherein the button depression guide further comprises a second groove-defining member that extends from a second portion of the wall of the internal cavity, the second groove-defining member defining a substantially arc-shaped groove through which the third cylindrically-shaped pin and the fourth cylindrically-shaped pin are guided when the pressure is applied to the button top.

4. The user input device of claim 3, wherein the first cylindrically-shaped pin and the third cylindrically-shaped pin comprise opposite ends of a first cylindrically-shaped rod that extends through a first aperture in the button stem and wherein the second cylindrically-shaped pin and the fourth cylindrically-shaped pin comprise opposite ends of a second cylindrically-shaped rod that extends through a second aperture in the button stem.

5. The user input device of claim 1, wherein the button depression guide comprises a first groove-defining member that extends from a first portion of a wall of the internal cavity and defines a first groove and a second groove-defining member that extends from a second portion of the wall of the internal cavity and defines a second groove, the first and second grooves each being substantially arc-shaped, and wherein the button stem comprises an arc-shaped panel having a first end that extends through and is moveable within the first groove and a second end that extends through and is moveable within the second groove.

6. The user input device of claim 1, wherein the button further comprises a button post that is disposed within the internal cavity and wherein the button biasing mechanism comprises a spring that is connected between the button post and a post that is affixed to a wall of the internal cavity.

7. The user input device of claim 1, wherein the button biasing mechanism comprises one of:
a leaf spring;
a torsion spring; or
one or more resilient plugs.

8. The user input device of claim 1, wherein the at least one sensor comprises a force transducer that measures a force applied via depression of the button.

9. The user input device of claim 1, wherein the at least one sensor comprises at least one of:
a tact switch;
a detector switch;
a magnetic sensor;
a potentiometer;
a capacitive sensor; or
a Hall effect sensor.

10. A user input device, comprising:
a housing that defines an internal cavity of the user input device and includes an aperture; and
a button-based control mechanism, comprising:
a button that comprises a button top and a button stem, the button top extending into or through the aperture in the housing such that the button top is externally accessible with respect to the housing, the button stem being disposed within the internal cavity of the user input device;
a button depression guide that is disposed within the internal cavity of the user input device that engages with the button stem to cause the button to move from a default position and along a substantially arc-shaped path when pressure is applied to the button top;
a button biasing mechanism disposed within the internal cavity that causes the button to return the default position when the pressure is removed from the button top; and
at least one sensor that detects actuation of the button responsive to movement of the button away from the default position.

11. The user input device of claim 10, wherein the button stem comprises a first cylindrically-shaped pin and a second cylindrically-shaped pin that extend from a first side of the button stem, and wherein the button depression guide comprises a first groove-defining member that extends from a first portion of a wall of the internal cavity, the first groove-defining member defining a substantially arc-shaped groove through which the first cylindrically-shaped pin and the second cylindrically-shaped pin are guided when the pressure is applied to the button top.

12. The user input device of claim 11, wherein the button stem further comprises a third cylindrically-shaped pin and a fourth cylindrically-shaped pin that extend from a second side of the button stem that is opposite to the first side of the button stem, and wherein the button depression guide further comprises a second groove-defining member that extends from a second portion of the wall of the internal cavity, the second groove-defining member defining a substantially arc-shaped groove through which the third cylindrically-shaped pin and the fourth cylindrically-shaped pin are guided when the pressure is applied to the button top.

13. The user input device of claim 12, wherein the first cylindrically-shaped pin and the third cylindrically-shaped pin comprise opposite ends of a first cylindrically-shaped rod that extends through a first aperture in the button stem and wherein the second cylindrically-shaped pin and the fourth cylindrically-shaped pin comprise opposite ends of a second cylindrically-shaped rod that extends through a second aperture in the button stem.

14. The user input device of claim 11, wherein the at least one sensor comprises a force transducer that measures a force applied via depression of the button.

15. The user input device of claim 10, wherein the button depression guide comprises a first groove-defining member that extends from a first portion of a wall of the internal cavity and defines a first groove and a second groove-defining member that extends from a second portion of the wall of the internal cavity and defines a second groove, the first and second grooves being substantially arc-shaped, and wherein the button stem comprises an arc-shaped panel having a first end that extends through and is moveable within the first groove and a second end that extends through and is moveable within the second groove.

16. The user input device of claim 10, wherein the button further comprises a button post that is disposed within the internal cavity and wherein the button biasing mechanism comprises a spring that is connected between the button post and a post that is affixed to a wall of the internal cavity.

17. The user input device of claim 10, wherein the button biasing mechanism comprises one of:
a sheet metal spring;
a torsion spring; or
one or more resilient plugs.

18. The user input device of claim 10, wherein the at least one sensor comprises at least one of:
a tact switch;
a detector switch;
a magnetic sensor;
a potentiometer;
a capacitive sensor; or
a Hall effect sensor.

19. A user input device, comprising:
a housing that defines an internal cavity of the user input device and includes an aperture; and
a button-based control mechanism, comprising:
a button that comprises a button top and a button stem, the button top extending into or through the aperture in the housing such that the button top is externally accessible with respect to the housing, the button stem being disposed within the internal cavity of the user input device and comprising a first and second cylindrically-shaped pin that extend from a first side thereof and a third and fourth cylindrically-shaped pin that extend from a second side of the button stem that is opposite to the first side of the button stem;

a button depression guide disposed within the internal cavity of the user input device that engages with the button stem to cause the button to move from a default position and along a non-linear path when a user presses on the button top, the button depression guide comprising a first groove-defining member defining a non-linear groove through which the first and second cylindrically-shaped pins are guided when pressure is applied to the button top and a second groove-defining member that extends from a second portion of the wall of the internal cavity defining a non-linear groove through which the third and fourth cylindrically-shaped pins are guided when the pressure is applied to the button top;

a button biasing mechanism disposed within the internal cavity that causes the button to return the default position when the pressure is removed from the button top; and at least one sensor that detects actuation of the button responsive to movement of the button away from the default position.

20. The user input device of claim 19, wherein the non-linear path includes at least one arc.

\* \* \* \* \*